March 27, 1956  I. E. WIEGERS  2,739,610
DIFFERENTIAL FLOAT VALVE
Filed March 18, 1955  2 Sheets-Sheet 1
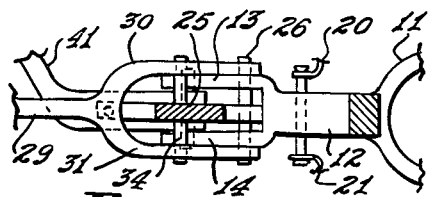
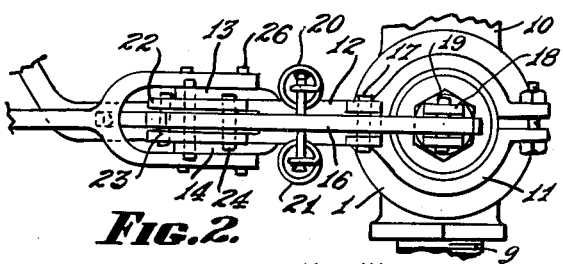
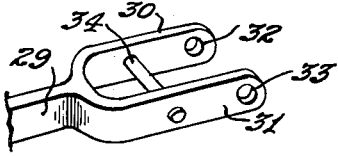
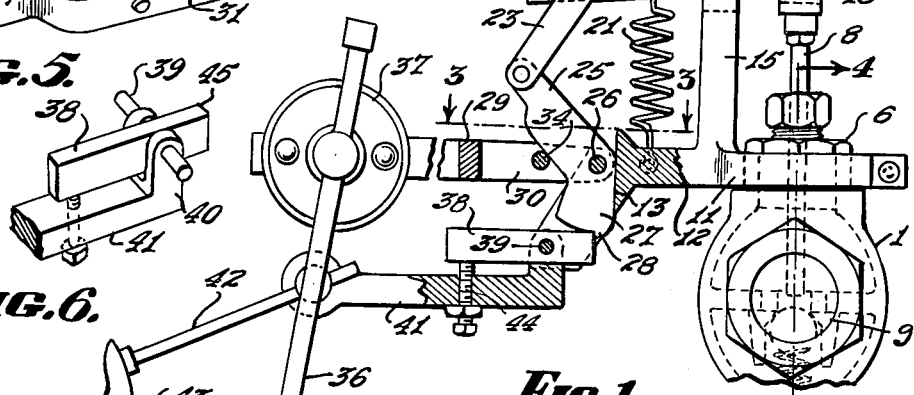
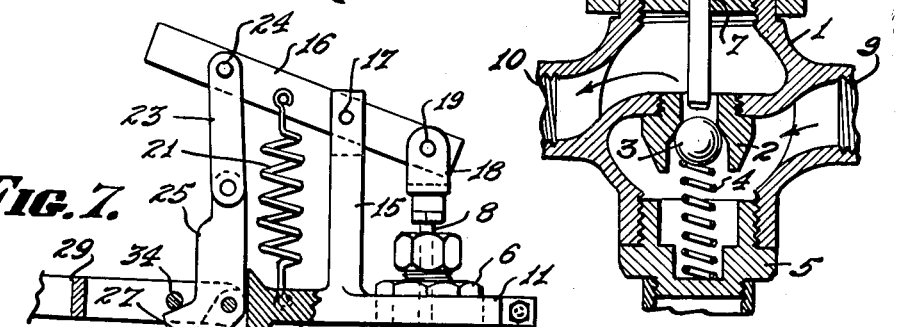
INVENTOR.
IRVIN E. WIEGERS,
BY Allen & Allen
ATTORNEYS.

March 27, 1956 I. E. WIEGERS 2,739,610
DIFFERENTIAL FLOAT VALVE
Filed March 18, 1955 2 Sheets-Sheet 2

INVENTOR.
IRVIN E. WIEGERS,
BY Allen & Allen
ATTORNEYS.

United States Patent Office 2,739,610
Patented Mar. 27, 1956

2,739,610

DIFFERENTIAL FLOAT VALVE

Irvin E. Wiegers, Hamilton, Ohio, assignor to Hamilton-Thomas Corporation, Hamilton, Ohio, a corporation of Ohio Application March 18, 1955, Serial No. 495,155

4 Claims. (Cl. 137—417)

My invention relates to float valves and more particularly to differential float valves wherein the valve is locked in either fully open or completely closed position until a predetermined liquid level is reached, whereupon operating mechanism is actuated which will instantaneously move the valve from one position to the other.

In the past numerous float valve constructions have been proposed wherein the valve is maintained in wide open position until the float reaches a predetermined position, whereupon the valve is immediately thrown to the closed position, thereby eliminating the undesirable effects resulting from a gradual or progressive closing or throttling of the valve encountered in a conventional float valve. Practically all of the float valves of this general character were designed specifically for use in toilet flush tanks wherein the primary problem was to overcome the noise caused by the gradual throttling of the valve as the tank was being filled. While the closing of the valve was controlled to prevent throttling, no special provision was made for the opening of the valve other than the normal fall of the float as the tank was emptied. There are, however, many uses for float valves other than in toilet flush tanks wherein it is desirable to control both the opening and the closing of the valve; and it is to the provisions of float valve structures in which the valve is both opened and closed quickly that the instant invention is directed.

In many industrial installations it is highly desirable that the control valve for a storage tank close quickly when a predetermined level is reached and remain closed as the liquid in the tank is withdrawn until a predetermined lower level is reached, whereupon the valve will quickly open to replenish the tank. Similarly, in sumps and analogous installations it is desirable to have a reverse acting valve which will open when a pre-determined level is reached so as to drain the tank, the valves remaining open until a given quantity of liquid has been removed therefrom. Such bi-directional control is particularly desirable where the control valve is used in conjunction with a pressure actuated pump since it will permit the pump to run for relatively long periods of time rather than the continual start and stop action which would result if the valve were of the throttling type. Bi-directional valves will also find utility in conjunction with injection pumps utilizing water or steam as the pumping medium. Similarly, valve structures in accordance with my invention will find wide utility as pilot valves for pressure controlled valves.

A principal object of my invention is to provide a quick acting valve in which the valve is actuated by a toggle operatively connected to the valve float.

A further object of my invention is the provision of a quick acting float valve incorporating two floats, one of which serves to operate the toggle and the other of which serves to control latch means for the toggle.

Yet a further object of my invention is the provision of toggle control means in a float valve which may be readily adapted for use for either direct or reverse acting float valves.

The foregoing as well as other objects of my invention which will appear hereinafter or which will be apparent to the skilled worker in the art upon reading these specifications, I accomplish by those constructions and arrangements of parts of which I shall now describe certain exemplary embodiments.

Reference is made to the accompanying drawings wherein:

Figure 1 is a side elevational view with parts broken away of a differential float valve in accordance with my invention.

Figure 2 is a plan view of the device illustrated in Figure 1.

Figure 3 is a sectional view taken along the line 3—3 of Figure 1.

Figure 4 is a sectional view taken along the line 4—4 of Figure 1.

Figure 5 is an enlarged partial perspective view of the forked stem for one of the floats.

Figure 6 is an enlarged fragmentary perspective view of the toggle latch.

Figure 7 is a partial side elevation with parts broken away illustrating the valve mechanism of Figure 1 in its opposite position.

Figure 8:
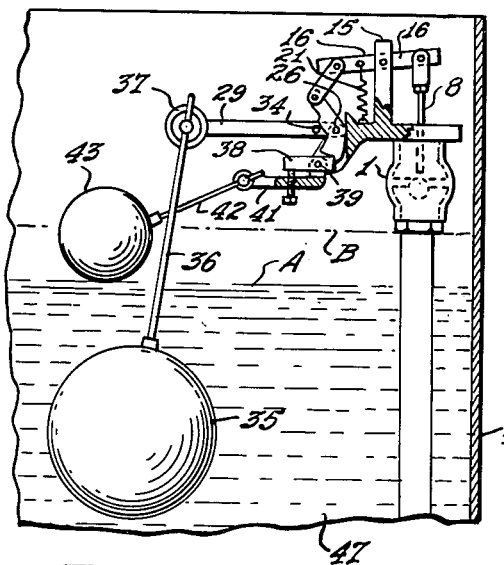
Figures 8, 9 and 10 are side elevational views illustrating the valve mechanism of Figure 1 in alternative positions of use.

Referring first to Figure 1 of the drawings, I have therein illustrated a reverse acting valve suitable for use in my invention. The valve comprises a body 1 having a seat bushing and ball guide 2 mounted therein. A ball 3 is urged against the seat bushing by means of a spring 4 compressed between the ball and a cap 5 closing the lower end of the valve body. The top of the body is closed by a cap 6 having a vertical bore 7 therein in which the valve stem 8 is slidably journaled for axial movement into and out of contact with the ball 3. Fluid is adapted to enter the valve body through the inlet port 9 and exit through the outlet port 10. It will be understood that the valve disclosed is exemplary only and does not constitute a limitation on my invention.

Surrounding and secured to the valve body 1 is a collar 11 having an integral lateral projection 12 which terminates outwardly in a spaced apart pair of depending legs 13 and 14. The lateral projection 12 also supports the fulcrum post 15 to which the lever 16 is pivoted intermediate its ends by means of a pivot pin 17. One end of the lever 16 is connected to the valve stem 8 by means of a clevis 18, a pivot pin 19 passing through both the clevis and the lever. On the opposite side of the fulcrum post 15, a pair of springs 20 and 21 extend between the lateral projection 12 and the lever 16, the springs serving to normally bias the end of the lever attached to the valve stem upwardly, thereby maintaining the stem in its uppermost position in which it is out of contact with the ball 3 and the valve is closed.

A pair of upper toggle links 22 and 23 are connected to the end of the lever 16 beyond the springs 20 and 21 by means of a pivot pin 24; and at their lower ends the toggle links 22 and 23 are pivoted to the upper end of a lower toggle link 25. The lower toggle link is received between the depending legs 13 and 14 and pivoted for movement relative thereto by means of pivot pin 26. The lower toggle link terminates at its opposite end in an angularly projecting extension 27 having a shoulder 28.

Movement of the toggle is controlled by the forked arm 29 which, as best seen in Figure 5, is provided with spaced apart tines 30 and 31 having aligned openings 32 and 33 adjacent the outer ends thereof. The tines lie to the outside of the depending legs 13 and 14 and are pivotally connected thereto by means of the pivot pin 26 which engages in the aligned openings 32 and 33. As will be apparent from Figure 2, the tines of the forked arm 29 also lie on opposite sides of the lower toggle link 25; and a cross bar 34 extends between the tines for contact with the lower toggle link.

The forked arm is under the influence of float 35 having a float rod 36 adjustably secured to the free end of the stem by means of a rosette 37.

A toggle latch 38 is pivotally secured between the lower ends of the leg 13 and 14 by means of a pin 39, the pin also mounting the bifurcated end 40 of a float lever 41. At its opposite end the float lever 41 carries a float rod 42 supporting a second float 43. At one end the toggle latch 38 is adapted to be contacted by an adjustment screw 44 extending upwardly through the float lever 41; and at its opposite end the corner edge 45 of the latch is adapted to engage the shoulder 28 of the lower toggle link 25.

Figure 9:
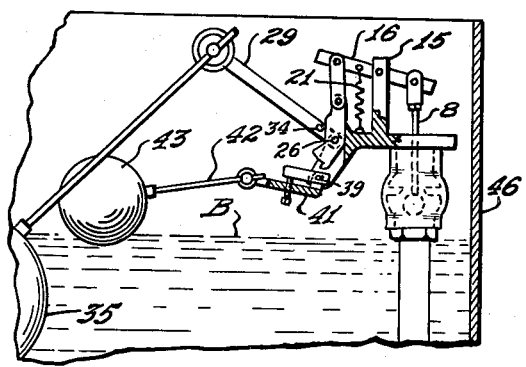
Figure 10:
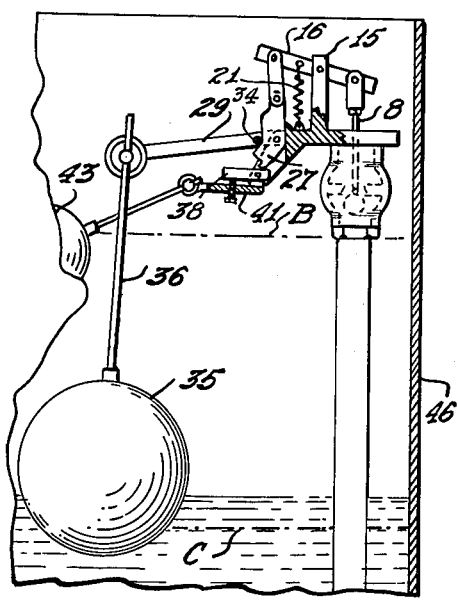

The operation of the float valve just described can be best understood by referring to Figures 8, 9 and 10 of the drawings wherein the valve is shown mounted in a tank 46 partially filled with a liquid 47 entering the tank from a source not shown. Since this is a reverse acting valve it will be closed during filling and hence the operating mechanism will initially occupy the closed position illustrated in Figures 1 and 8 in which the valve stem 8 is biased to its uppermost position by means of the lever 16 which is under the influence of the springs 20, 21. The toggle links are in the contracted position and the shoulder 28 carried by the lower toggle extension 27 is engaged by the edge 45 of the latch 38, thereby locking the toggle against movement toward its extended position. The locking of the toggle serves to lock the lever arm 16 against pivoting movement and hence the valve stem 8 is locked with the valve in closed position.

The float 35 which actuates the forked arm 29 is arranged to extend below the float 43 so that it will be contacted by the liquid in the tank well in advance of the float 43. As the liquid level rises, the float 35 will rise with the liquid level until the point is reached at which the cross bar 34 carried by the forked arm 29 contacts the lower edge of the lower toggle link 25. Since the toggle link is locked against movement by the latch 38 further upward movement of the float 35 and hence the forked stem 29 is prevented. The rising liquid will then cover and rise above the float 35. As the liquid continues to rise it contacts the float 43 which is free to rise with the advancing liquid. Figure 8 illustrates the condition of the parts as the liquid reaches the float 43, the liquid level being indicated at A. It will be noted that at this point the float 35 is completely submerged. Since the float 43 is free to rise, the continued advance of the liquid will raise the float 43 which, through the rod 42, will cause the float lever 41 to pivot about the pin 39, thereby causing the toggle latch 38 to also pivot about the pin 39 until the corner edge 45 is freed from contact with the shoulder 28 of the lower toggle link.

The release of the latch pin places the toggle under the influence of the cross bar 34 carried by the forked arm 29 which is thrown upwardly by the submerged float 35 as it seeks the surface of the liquid upon being released. As the forked stem 29 is thrown upwardly by the action of the float, the cross bar 34 acts against the lower toggle link 25 causing it to pivot about the pivot pin 26, thereby expanding the toggle links and moving them past dead center to the position illustrated in Figures 7 and 9. This action causes the lever 16 to move the valve stem 8 downwardly so as to open the valve.

It will be understood that the size of the float 35 will be chosen so that its buoyancy will be sufficiently great, when the float is submerged, to propel the float upwardly to the surface of the liquid with sufficient force to overcome the force of the springs 20 and 21 which secure the lever arm 16. Similarly, it will be understood that the relative positions of the two floats may be adjusted to suit the needs of use. For example, the float 43 may be adjusted so that it will trip the toggle latch 38 when the liquid in the tank reaches the level B.

It will be apparent that once the toggle has been thrown past dead center, it will remain there until positive force is applied to return it to its original position. This force is applied by the forked arm 29 which, as the liquid level in the tank falls, is lowered by the float 35. Thus, when the float falls to a predetermined position in accordance with the lowering of the liquid level in the tank, the downward movement of the forked arm brings the cross bar 34 into contact with the angular extension 27 of the lower toggle link. Continued downward movement of the arm 29 will cause the lower toggle link to pivot past dead center whereupon the toggle and the lever 16 immediately come under the influence of the springs 20 and 21 which snap the toggle to its retracted position thereby closing the valve and at the same time locking the toggle by bringing the shoulder 28 into the latch engaging position. As illustrated in Figure 10, the float 35 may be so adjusted that the valve will be closed when a predetermined liquid level C is reached. It will also be apparent from Figure 10 that a considerable distance may exist between the valve opening level B and the valve closing level C, thereby permitting the valve to remain open for a substantial length of time. This is particularly desirable in installations where the valve serves to control a pressure actuated pump.

Figure 11:
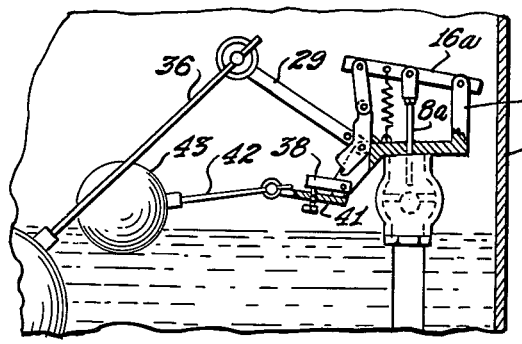
Figures 11 and 12 illustrate alternative positions of use of a modified form of the invention.
Figure 12:
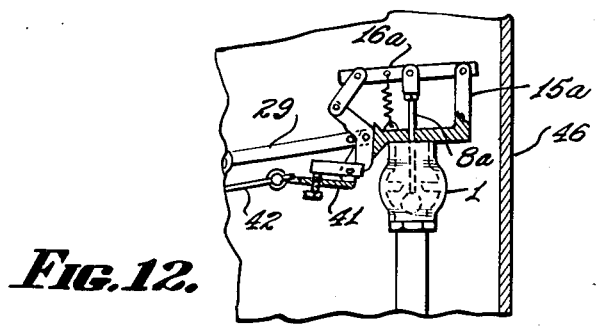

While I have thus far described my invention as it applies to a reverse acting valve, it is equally applicable to a float valve which will close when a predetermined liquid level is reached. Such modified form of the invention is illustrated in Figures 11 and 12 wherein like parts have been given like reference numerals. Essentially, the only change in structure which need be made is the placement of the fulcrum post and the manner in which the lever is secured thereto. As seen in Figure 11, for example, the fulcrum post pivotally supports the end of the lever arm 16a at the end opposite the toggle. The valve stem 8a is thus depressed or in valve opening position, as seen in Figure 12, when the toggle is in the retracted or locked position. Upon the filling of the tank, the toggle will be released and thrown to the extended position, as illustrated in Figure 11, in which position it lifts the valve stem 8a away from the ball so as to permit the closing of the valve. The action of the floats and the toggle control mechanism will be identical with that described in connection with the device of Figure 1. In both embodiments the valve is both opened and closed in a rapid manner and the adjustment of the floats permits the control of the opening and closing movement within wide limits.

It will be understood that modifications may be made in my invention without departing from the spirit of it. Having, however, described my invention in certain exemplary embodiments, what I desire to secure and protect by Letters Patent is:

1. In a float control for a valve having a body and also having a movable valve stem for opening and closing said valve, a collar adapted to be secured to said valve body, a fulcrum arm extending upwardly from said collar, a lever pivotally connected to said fulcrum arm, means for connecting said valve stem to said lever, a toggle joint comprising upper and lower links connected at its upper end to said lever and it its lower end to an extension of said collar, spring means extending between said lever and said extension for biasing the links of said toggle joint to the contracted position, a vertically movable arm pivoted at one end to said extension, said arm including means for contacting the lower link of said toggle joint when said joint is in the contracted position and upon upward movement of the said arm, acting to expand the links of said toggle joint, and a float connected to the free end of said arm.

2. The float control claimed in claim 1 wherein the lower link of said toggle joint includes an angularly related extension having a shoulder, a latch pivotally connected to the extension of said collar and adapted to engage said shoulder when said lower toggle link is in the contracted position, and float actuated release means for pivoting said latch so as to disengage it from said shoulder and thereby release said toggle joint for movement under the influence of said pivoted arm.

3. The float control claimed in claim 2 wherein said float actuated release means comprises a float lever pivotally connected to the extension of said collar for vertical movement relative thereto, adjustable means carried by said float lever for tripping said latch upon upward movement of said float lever, and a second float connected to the free end of said float lever.

4. The float control claimed in claim 3 wherein upward movement of the arm contacting said toggle joint acts to expand the toggle joint beyond dead-center so as to lock the links thereof in the expanded position, and wherein downward movement of said arm brings it into engagement with the extension of the lower toggle link and acts to return the toggle links from their beyond dead-center position so as to place them under the influence of said spring means, whereby the said toggle joint is immediately returned to its contracted position.

References Cited in the file of this patent

UNITED STATES PATENTS

| | | |
|---|---|---|
| 1,044,403 | Luce et al. | Nov. 12, 1912 |
| 2,182,997 | Thomas | Dec. 12, 1939 |
| 2,666,447 | Rand | Jan. 19, 1954 |